US007669233B2

(12) United States Patent
Grace et al.

(10) Patent No.: US 7,669,233 B2
(45) Date of Patent: Feb. 23, 2010

(54) METHODS AND SYSTEMS FOR SECURE TRANSMISSION OF IDENTIFICATION INFORMATION OVER PUBLIC NETWORKS

(75) Inventors: David Grace, Superior, CO (US); Paul Turgeon, Fort Collins, CO (US)

(73) Assignee: Metavante Corporation, Brown Deer, WI (US)

( * ) Notice: Subject to any disclaimer, the term of this patent is extended or adjusted under 35 U.S.C. 154(b) by 1262 days.

(21) Appl. No.: 11/067,306

(22) Filed: Feb. 25, 2005

(65) Prior Publication Data

US 2005/0228755 A1 Oct. 13, 2005

Related U.S. Application Data

(63) Continuation-in-part of application No. 10/086,793, filed on Mar. 1, 2002, which is a continuation-in-part of application No. 09/394,143, filed on Sep. 10, 1999, now Pat. No. 7,386,516.

(60) Provisional application No. 60/548,824, filed on Feb. 27, 2004.

(51) Int. Cl.
*G06F 21/00* (2006.01)
*H04L 9/32* (2006.01)
*H04K 1/00* (2006.01)
*G06F 15/16* (2006.01)

(52) U.S. Cl. .............................. 726/9; 726/20; 713/185

(58) Field of Classification Search ........................ None
See application file for complete search history.

(56) References Cited

U.S. PATENT DOCUMENTS

| 4,259,720 | A | 3/1981 | Campbell |
| 4,827,508 | A | 5/1989 | Shear |
| 4,906,828 | A | 3/1990 | Halpern |
| 5,220,501 | A | 6/1993 | Lawlor et al. |
| 5,323,146 | A * | 6/1994 | Glaschick .................... 726/18 |
| 5,371,797 | A | 12/1994 | Bocinsky, Jr. |
| 5,453,601 | A | 9/1995 | Rosen |
| 5,457,746 | A | 10/1995 | Dolphin |
| 5,539,828 | A | 7/1996 | Davis |
| 5,590,197 | A | 12/1996 | Chen et al. |
| 5,623,547 | A | 4/1997 | Jones et al. |
| 5,677,953 | A | 10/1997 | Dolphin |
| 5,734,823 | A | 3/1998 | Saigh et al. |
| 5,771,291 | A | 6/1998 | Newton et al. |
| 5,850,446 | A | 12/1998 | Berger et al. |
| 5,870,724 | A | 2/1999 | Lawlor et al. |
| 5,872,917 | A * | 2/1999 | Hellman ........................ 726/6 |

(Continued)

*Primary Examiner*—Christopher A Revak
(74) *Attorney, Agent, or Firm*—Townsend and Townsend and Crew LLP

(57) ABSTRACT

Methods and systems are provided for generating a party static token to be used in combination with a party dynamic token for identifying a party to a host system. Identification information that identifies the party to the host system is received. Such identification information includes a host dynamic token and a host static token. A false host dynamic token that differs from the host dynamic token is generated. The host dynamic token and the false host dynamic token are encrypted. In addition, information that uniquely identifies the party dynamic token is encrypted. The party static token is produced from a combination of the encrypted host dynamic token, the encrypted false host dynamic token, and the encrypted information that uniquely identifies the party dynamic token.

33 Claims, 5 Drawing Sheets

U.S. PATENT DOCUMENTS

| | | |
|---|---|---|
| 5,889,863 A | 3/1999 | Weber |
| 5,892,900 A | 4/1999 | Ginter et al. |
| 5,903,881 A | 5/1999 | Schrader et al. |
| 5,913,202 A | 6/1999 | Motoyama |
| 5,956,483 A | 9/1999 | Grate et al. |
| 6,065,073 A | 5/2000 | Booth |
| 6,073,160 A | 6/2000 | Grantham et al. |
| 6,098,053 A | 8/2000 | Slater |
| 6,173,269 B1 | 1/2001 | Solokl et al. |
| 6,182,220 B1 * | 1/2001 | Chen et al. .................. 713/182 |
| 6,195,357 B1 | 2/2001 | Polcyn |
| 6,505,178 B1 | 1/2003 | Flenley |
| 6,526,489 B1 | 2/2003 | Kikuchi et al. |
| 6,553,492 B1 | 4/2003 | Hosoe |
| 6,904,526 B1 * | 6/2005 | Hongwei ..................... 713/182 |
| 7,103,912 B2 * | 9/2006 | Xia et al. ....................... 726/8 |
| 7,228,417 B2 * | 6/2007 | Roskind ..................... 713/168 |
| 7,309,004 B1 * | 12/2007 | Muschellack et al. ....... 235/379 |
| 7,343,014 B2 * | 3/2008 | Sovio et al. .................. 380/278 |
| 7,451,322 B2 * | 11/2008 | Lee ............................. 713/183 |
| 2002/0152180 A1 | 10/2002 | Turgeon |
| 2002/0166048 A1 | 11/2002 | Coulier |
| 2003/0014371 A1 | 1/2003 | Turgeon |
| 2003/0093680 A1 * | 5/2003 | Astley et al. ................ 713/183 |
| 2003/0204732 A1 | 10/2003 | Audebert et al. |
| 2003/0208684 A1 | 11/2003 | Camacho et al. |
| 2004/0030932 A1 * | 2/2004 | Juels et al. .................. 713/202 |
| 2004/0062400 A1 * | 4/2004 | Sovio et al. ................. 380/286 |
| 2007/0180507 A1 | 8/2007 | Lu et al. |
| 2007/0249324 A1 * | 10/2007 | Jou et al. ..................... 455/411 |
| 2008/0034216 A1 * | 2/2008 | Law ............................ 713/183 |
| 2009/0092255 A1 * | 4/2009 | Jou et al. ..................... 380/279 |

* cited by examiner

METHODS AND SYSTEMS FOR SECURE TRANSMISSION OF IDENTIFICATION INFORMATION OVER PUBLIC NETWORKS

CROSS-REFERENCES TO RELATED APPLICATIONS

This application is a nonprovisional of, and claims the benefit of the filing date of, U.S. Provisional Patent Appl. No. 60/548,824, entitled "METHODS AND SYSTEMS FOR SECURE TRANSMISSION OF IDENTIFICATION INFORMATION OVER PUBLIC NETWORKS," filed Feb. 27, 2004 by David Grace and Paul Turgeon, the entire disclosure of which is incorporated by reference for all purposes.

This application is a continuation-in-part application of U.S. patent application Ser. No. 10/086,793, entitled "SYSTEM AND METHOD FOR PERFORMING SECURE REMOTE REAL-TIME FINANCIAL TRANSACTIONS OVER A PUBLIC COMMUNICATIONS INFRASTRUCTURE WITH STRONG AUTHENTICATION," filed Mar. 1, 2002 by Paul Turgeon, which is a continuation-in-part application of U.S. patent application Ser. No. 09/394,143, entitled "SYSTEM AND METHOD FOR PROVIDING SECURE SERVICES OVER PUBLIC AND PRIVATE NETWORKS USING A REMOVABLE, PORTABLE COMPUTER-READABLE STORAGE MEDIUM AT A NETWORK ACCESS DEVICE," filed Sep. 10, 1999 by Paul Turgeon, the entire disclosures of both of which are incorporated herein by reference in their entireties for all purposes.

BACKGROUND OF THE INVENTION

This application relates generally to information security. More specifically, this application relates to methods and systems for secure transmission of identification information over public networks.

There are numerous instances in which parties may wish to access a host system over a public network. In many instances, the host system is configured with security protocols to limit access to legitimate parties, and such security protocols typically rely on the receipt and verification of identification information. For example, the identification information might comprise a combination of a user identifier and a secret password, with access to the host system being granted only upon presentation by the user of both pieces of the identification information. While the ability for parties to access a host system over a public network presents numerous conveniences, it also presents a danger that the security of the identification information might be comprised as a result of interception by an eavesdropper.

A basic arrangement that is currently commonly used in connecting parties to a host system over a public network is illustrated in FIG. 1. The public network 108 is configured to establish a connection between the host system 112 and the party 104 in response to a request from the party 104. Usually, the host system 112 includes a security protocol 116 that verifies identification information provided by the party 104 and transmitted with the public network 108. In many instances, the security protocol 116 is equipped with fraud-detection algorithms, a simple example of which is an algorithm that flags repeated attempts to gain access to the host system 112. For example, one such fraud-detection algorithm permits a party 104 to make no more than three incorrect attempts at entering a password; if a fourth incorrect attempt is made, the algorithm locks out that party 104 until some corrective action is taken, perhaps initiated by a telephone call from the party 104.

Such a security protocol 116 thus aids in preventing a hostile party from attempting to guess a legitimate party's password, but is less effective when the identification information may be intercepted by an eavesdropper 120. The danger of interception by eavesdroppers 120 has, moreover, been increasing as public networks are more widely used. Rather than remember multiple different passwords, parties 104 frequently use the same password to access multiple different host systems 112. If an eavesdropper intercepts a transmission from a particular party 104 for any host system 112, he may obtain information to gain access to multiple host systems 112.

One technique that has been used to compensate for such possibilities is to provide an intermediate system that maintains a record of identification information for multiple host systems 112 on behalf of a party, and requiring only a single password for that party 104. When the party wishes to access a certain host system 112, the transmission is routed through the intermediate system, which detects whether the single password is correct, transmitting the appropriate host password only if it is. Such a technique protects the host system 112 from potential fraud by truncating the transmission when an incorrect password is provided.

One disadvantage of such an arrangement, however, is that this technique also circumvents the security protocol 116 that may exist at the host system 112. This is true of all arrangements that use truncation of transmission to the host system 112 as part of fraud prevention. Circumvention of the host system's security protocol 116 thus deprives that protocol of information that may be useful in analyzing patterns of attempted security breaches. Furthermore, it is generally undesirable to implement the host system's security protocol 116 at the intermediate system. Not only would such implementation require duplication of the significant investment already made by multiple host systems 112, but it would also remove control of the security protocol from the host systems 112. This is particularly disadvantageous since the security protocols for each host system 112 frequently reflect security concerns specific to that host system 112 and may benefit from periodic revision as those particular security concerns change.

There is accordingly a general need in the art for improved methods and systems for secure transmission of identification information over public networks.

BRIEF SUMMARY OF THE INVENTION

Embodiments of the invention provide methods and systems that permit secure transmission of identification information over public networks. The identification information includes a party static token and a party dynamic token, which are tokens provided by a party when access to a host system is desired. The combination of the party static token and the party dynamic token are used to generate a host static token and a host dynamic token, which are used by the host system to confirm the party's identity. In the event that a party supplies an incorrect party dynamic token, the methods and systems result in the host system being supplied with an incorrect host dynamic token so that security protocols implemented by the host system may still be used.

In one set of embodiments, a method is provided for generating a party static token to be used in combination with a party dynamic token for identifying a party to a host system. Identification information that identifies the party to the host system is received. Such identification information comprises a host dynamic token and a host static token. A false host dynamic token that differs from the host dynamic token is generated. The host dynamic token and the false host dynamic token are encrypted. In addition, information that uniquely identifies the party dynamic token is encrypted. The party static token is produced from a combination of the encrypted host dynamic token, the encrypted false host dynamic token, and the encrypted information that uniquely identifies the party dynamic token.

In one such embodiment, the party static token may be produced by encrypting the combination of the encrypted host dynamic token, the encrypted false host dynamic token, and the encrypted information that uniquely identifies the party dynamic token. Each of the encrypting steps may be performed with a symmetric-key encryption algorithm, and in some instances each of the encrypting steps may be performed with a different key. In one embodiment, encrypting the host dynamic token and encrypting the false host dynamic token are performed with the same key.

In another embodiment, the information that uniquely identifies the party dynamic token comprises a seed value and a complement to the party dynamic token. In such instances, the method may further comprise determining the complement to the party dynamic token from the seed value and the party dynamic token. For example, the seed value may be encrypted, and a portion of the encrypted seed value having a predetermined length may be selected to produce a natural party dynamic token. A different between the natural party dynamic token and the party dynamic token is calculated. The seed value could be generated randomly. In some instances, the party dynamic token may be received from the host system, while in other instances the party dynamic token may be generated randomly.

In another set of embodiments, a method is provided for transmitting party-identification information to a host system. A party static token and a purported party dynamic token are received from a party. The party static token is decrypted to extract an encrypted host dynamic token, an encrypted false host dynamic token, a host static token, and encrypted information that uniquely identifies a party dynamic token. The host static token and host dynamic token identify the party to the host system, and the false host dynamic token differs from the host dynamic token. The party dynamic token is generated from the encrypted information that uniquely identifies the party dynamic token. A decrypted one of the host dynamic token and false host dynamic token is transmitted with the host static token to the host system depending on a comparison of the party dynamic token and purported party dynamic token. In some such embodiments, the one of the host dynamic token and false host dynamic token may be decrypted depending on the comparison of the party dynamic token and purported party dynamic token.

In some instances, the party static token and purported party dynamic token may be received over a public network from a public-network access device accessed by the party. In other instances, the party static token and purported party dynamic token may be received over a public network from an intermediary system accessed by the party with a public-network access device.

The party dynamic token may be generated by decrypting the encrypted information that uniquely identifies the party dynamic token to extract a seed value and a complement to the party dynamic token. The party dynamic token is then generated from the seed value and the complement. For example, the seed value may be encrypted and a portion of the encrypted seed value having a predetermined length may be selected to produce a natural party dynamic token. A different between the natural party dynamic token and the complement may then be calculated. Each of the decrypting steps may be performed with a symmetric-key decryption algorithm and, in some instances, each of the decrypting steps may be performed with a different key.

The methods of the present invention may be embodied in computer-readable storage media having a computer-readable program embodied therein for directing operation of a token preparer (to generate the party static token) or of a public-network intercept (to transmit party-identification information to the host system). Such devices may each include a communications system, a processor, and a storage device. The computer-readable programs include instructions for operating the respective devices to in accordance with the embodiments described above.

In a further set of embodiments, a computer-readable storage medium may be provided with a data structure comprising a plurality of fields. A first field contains data representing an encrypted host dynamic token. A second field contains data representing an encrypted false host dynamic token, with the false host dynamic token differing from the host dynamic token. A third field contains data representing a host static token, where a pairing of the host static token and host dynamic token provide information identifying a party to a host system and a pairing of the host static token and false host dynamic token do not provide information identifying the party to the host system. A fourth field contains data that uniquely identify a party dynamic token that identifies the party when paired with the data structure.

In some instances, the first, second, third, and fourth fields may be commonly encrypted with a first symmetric key encryption algorithm. In one such instance the host dynamic token and false dynamic token are encrypted with a common second symmetric-key algorithm. In other instances, the third field may comprise a first subfield containing data representing a seed value and a second subfield containing data representing a party dynamic token complement; the host dynamic token is equal to a result of applying a predetermined algorithm to the seed value, the party dynamic token complement, and the party dynamic complement. In one embodiment, the data contained by the third field are encrypted with a first symmetric-key algorithm that differs from a second symmetric-key algorithm under which the host dynamic token and false host dynamic token are commonly encrypted.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention enable connections to be established between a party and a host system over a public network by providing for secure transmission of identification information over the public network. As used herein, a "public network" is intended to refer to a network that permits access to a group of parties that belong to a common community. For example, in some embodiments, the public network could correspond to a network such as the Internet, in which the common community essentially includes the entire world. In other instances, though, the common community could be more restrictive, such as corresponding to an academic community at a university, with the public network being the network accessible to the members of that academic community.

There are a variety of specific applications in which connections to a public network may be used. For example, in the specific case where the public network comprises the Internet, the host system could be any system that a party might wish to access securely. For instance, the host system could administer a financial web site where a party might manage funds that are in one or more accounts, such as a mutual-fund web site, a bank web site, and the like. In another embodiment, the host system could provide restricted access to publication material to parties who have paid for access. In a further embodiment, the host system could be a computer system of an employer of a party so that files, programs, and the like could be accessed by the party employee remotely.

It is emphasized that these examples are merely illustrative and that there are many more examples of host systems that are within the scope of the invention and intended to permit restricted access to parties over a public network. Many such additional examples will be evident to those of skill in the art. Furthermore, while the above examples are drawn in connection with the Internet, further applications exist with other examples of public networks.

Figure 1:
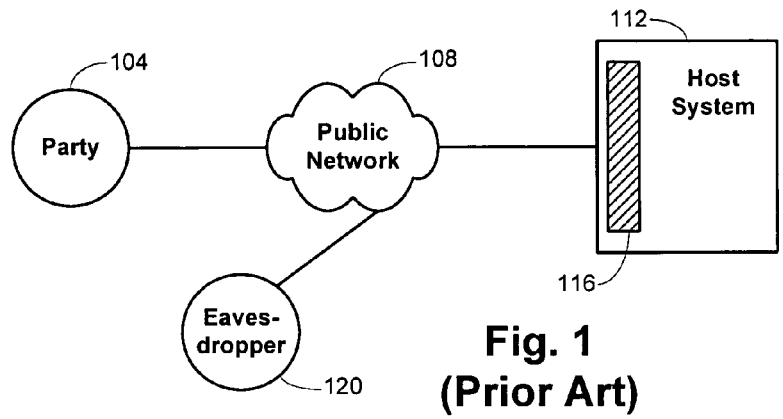
FIG. 1 is a block-diagram representation of a prior-art arrangement for connecting a party to a host system.
Figure 2A:
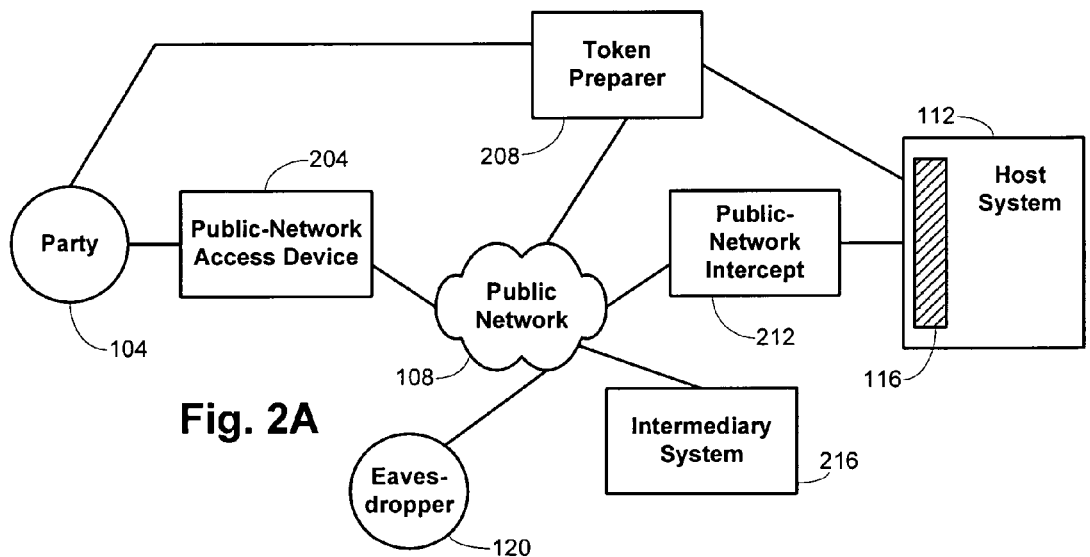
FIG. 2A is a block-diagram representation of an arrangement for connection a party to a host system in an embodiment of the invention.

FIG. 2A provides a schematic overview of an architecture in which a party 104 may access a host system 112 over a public network 108 in accordance with an embodiment of the invention. The same reference labels for the party 104, public network 108, and host system 112 are used as is FIG. 1 to emphasize that embodiments of the invention may be effected, if desired, without changes to these components. In particular, no architectural change is needed to an existing legacy host system or to an existing public network in order to accommodate these embodiments. Advantageously, the host system 112 may retain control over its own security protocol, as discussed in greater detail below. Access of the party 104 to the host system 112 is provided by a public-network access device 204 that is interfaced with the public network 108. Where the public network 108 comprises a computational network such as the Internet, the public-network access device 204 could comprise a computational device, such as a personal computer, laptop, personal digital assistant, and the like. Where the public network 108 comprises a cable network, the public-network access device 204 could comprise a combination of a television and set-top box. In still other instances, other appropriate devices could be used as a public-network access device 204 depending on the specific characteristics of the public network 108. A public-network intercept 212 is provided to intercept communication of identification information from the public network 108 to the host system 112 and to act on that identification information as described below.

In some instances, the identification information may pass through an intermediary system before it reaches the public-network intercept 212 or host system 112, which increases the risk of interception of the identification information by an eavesdropper 120. For example, in the context of electronic commerce, the host system 112 could correspond to a bank system managing an account that holds funds belonging to the party and the intermediary system could correspond to a system managing a merchant's sales web site. In order to make a purchase, the party 104 might access a web site managed by the intermediary system 216 over the public network to search for goods and make a selection to be purchased. An interface provided by the intermediary system 216 might then permit the party to identify the host system 112 where funds for the transaction could be sought, together with the party's identification information. Upon receipt of acceptable identification information and authorization from the party to provide the specified funds to the merchant, the host system 112 may arrange for transfer of the funds to the control of the merchant.

The architecture shown in FIG. 2A also includes a token preparer 208, which is used as described in greater detail below to prepare tokens that are comprised by the identification information. The manner in which the tokens may be transmitted, and the general role played by the token preparer 208 and public-network intercept 212, is illustrated with FIG. 2B. In this figure, the vertical lines correspond to certain of the elements shown in FIG. 2A, namely the party 104, the token preparer 208, the public-network intercept 212, and the host system 112, with the horizontal arrows showing schematically the transfer of static and dynamic tokens among such elements in effecting embodiments of the invention.

As used herein, "tokens" refer generically to identification information that is used in gaining access to a secure host system. The identification information has at least two components, one of which is a "static token," and the other of which is a "dynamic token." The static token is a generally fixed identifier that corresponds uniquely to the party 104, or in some instances to a related group of parties. For example, in one embodiment, the static token could comprise a user identification, commonly referred to in the art as a "userid." Each distinct userid could identify a distinct party, although is some instances multiple parties might sometimes share a common userid such as where a project team might establish a userid for accessing materials related to a project, such as where members of a family share a common family userid, and the like. The dynamic token is associated with the static token, with that association being used to confirm the validity of the combination in providing access to the host system 112. For example, in the case where the static token is a userid, the associated dynamic token could be a password. In some instances, particularly in cases where a single static token is used to identify a related group of parties, a plurality of dynamic tokens could be associated with each static token, perhaps with each associated dynamic token identifying one of the parties. For example, a common userid could have several valid passwords associated with it, each of which is known to only one of a group of parties and therefore identifies that party from the group. In other embodiments, such as in the context where the host system is a financial host system, the static token could correspond to a primary account number ("PAN"), with the dynamic token corresponding to a personal identification number ("PIN"). In still other embodiments, the static and dynamic tokens may take still other forms.

Embodiments of the invention permit different static and dynamic tokens to be used by the host system 112 and by the party 104. The examples provided above, in the form of userid/password, PAN/PIN, and the like, are typical examples of a host static and dynamic tokens that may be used by existing host systems 112 in identifying parties 104. According to embodiments of the invention, the party 104 is assigned different static and dynamic tokens by the token preparer 208, which incorporate the host's static and dynamic tokens, but permit them to be transmitted securely over the public network. The public-network intercept may extract the host static and dynamic tokens from the party static and dynamic tokens after their transmission through the public network 108 for presentation and authentication by the host system 112.

Figure 2B:
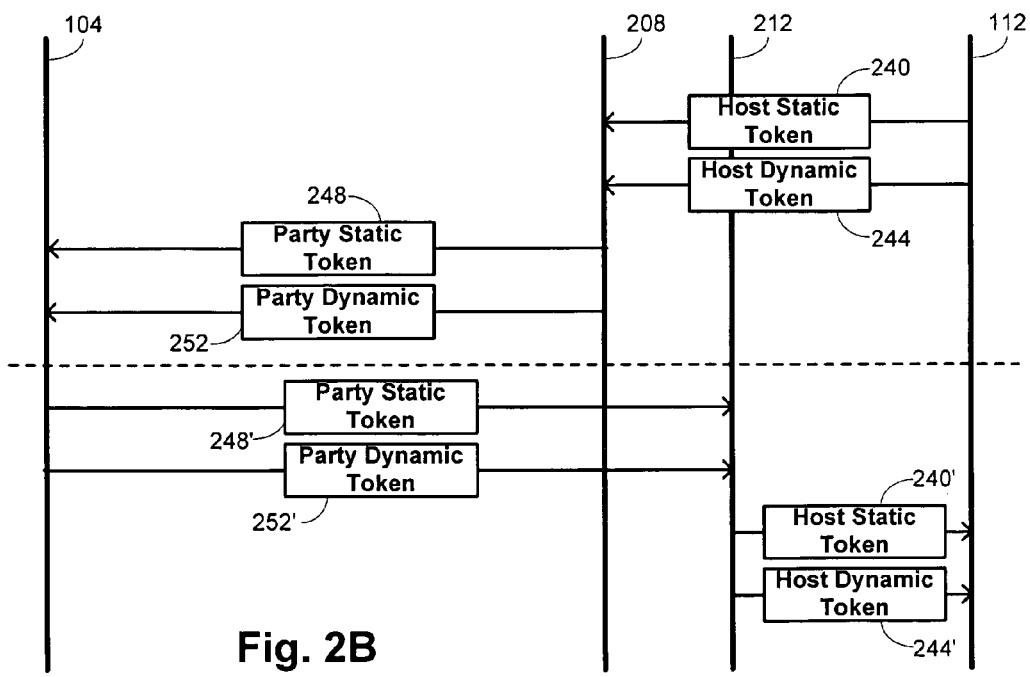
FIG. 2B is a schematic illustration of a flow of static and dynamic tokens in implementing an embodiment of the invention.

Thus, as illustrated in FIG. 2B, there are two phases that may be involved in providing the secure transmission methods and systems—conveying relevant tokens to the party 104, shown schematically above the dotted line, and using the relevant tokens for obtaining access to the host system 112, shown schematically below the dotted line. In conveying the relevant tokens to the party 104, the host system 112 initially provides the identifying host static token 240 and host dynamic token 244 to the token preparer 208. The token preparer 208 generates the party static token 248 and party dynamic token 252, such as in accordance with the method described in detail in connection with FIG. 3 below. When a party wishes to obtain access to the host system 112, a supplied party static token 248' and party dynamic token 252' are intercepted with the public-network intercept 212. The public-network intercept 212 extracts the host static token 240' and host dynamic token 244' for transmission to the host system 112, such as in accordance with the method described in detail in connection with FIG. 5 below.

Figure 3:
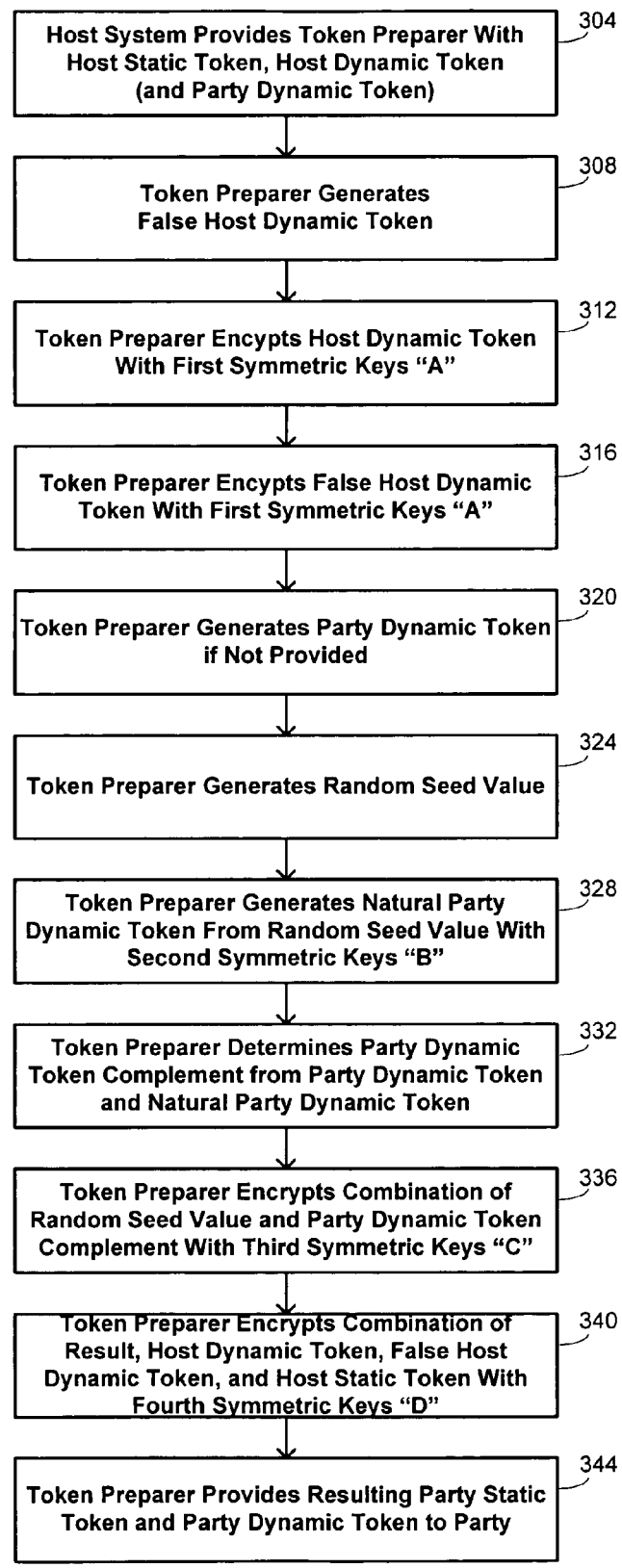
FIG. 3 is a flow diagram illustrating a method for providing static and dynamic tokens to a party in accordance with an embodiment of the invention.

The flow diagram of FIG. 3 provides an illustration of a method for providing the party 104 with the party static and dynamic tokens 248 and 252 in one embodiment. At block 304, the token preparer 208 is provided with the host static token 240 and the host dynamic token 244, and perhaps also with the party dynamic token 252. The host static token 240 and host dynamic token 244 define the combination of identification information that the host system 112 expects to receive in order to permit access. While in many instances, the party 104 may be left to select the party dynamic token 252, in some instances it may be preferable for it to be assigned by the host system 112. Such assignment may be done on a random basis, which avoids the tendency of parties 104 to select tokens that are more easily remembered, and therefore more easily compromised, because they represent a combination meaningful to the party 104. The invention is not restricted by the format of the host static and dynamic tokens 240 and 244, which may be numeric, alphabetic, alphanumeric, case-sensitive or -insensitive, of arbitrary length, and the like.

At block 308, the token preparer 208 generates a false host dynamic token 404. The false host dynamic token 404 may generally take the form of any token that is not identical with the host dynamic token 244 so that presentation of the false host dynamic token 404 in combination with the host static token 240 to the host system 112 will result in a denial of access. It may be convenient, however, for the false dynamic token 404 to be generated with approximately the same format as the host dynamic token 244 in some embodiments. Furthermore, presentation of such a combination is intended to prompt implementation of any security protocol 116 included with the host system 112 so that the benefits of recording false attempts at access in accordance with that security protocol 116 will be maintained.

The preparation of the party static token includes a number of encryption techniques performed with one or more symmetric-key encryption algorithms. Such symmetric-key algorithms are such that one of the encryption key and decryption key may be calculated from the other; in many such algorithms, the encryption and decryption keys are simply the same. Symmetric-key algorithms include stream ciphers, in which plaintext is converted to ciphertext one bit (or byte) at a time, and block ciphers, which operate on blocks of plaintext. Many examples of such symmetric-key algorithms are well know to those of skill in the art and include, merely by way of example, the Data Encryption Standard ("DES"), the triple Data Encryption Algorithm ("3DEA"), and the Advanced Encryption Standard ("AES"), among others.

At block 312, a symmetric-key algorithm using first keys designated "A" is used by the token preparer 208 to encrypt the host dynamic token 244. Similarly, at block 316 the false host dynamic token 404 is also encrypted with a symmetric-key algorithm, which may conveniently use the same keys "A." If no party dynamic token 252 was provided by the host system 112 at block 304, one may be generated by the token preparer 208 at block 320. Such generation may be performed in concert with the party 104, such as by using a party dynamic token 252 requested by the party 104, or may be performed randomly by the token preparer 208, perhaps in conformity with formatting requirements specified by the host system 112 and/or party 104.

At block 328, the token preparer 208 generates a "natural" party dynamic token. This token is referred to as the "natural" party dynamic token because it is determined in accordance with a specified algorithm from a specific seed value 412, which may be generated randomly. In one embodiment, the specified algorithm may comprise a symmetric-key algorithm using second keys designated "B." This algorithm is applied to the random seed value 412, with all or a specific portion of the result being extracted to define the natural party dynamic token. A mapping between the natural party dynamic token and the party dynamic token 252 is defined at block 332 by determining a party dynamic token complement 408 from the party dynamic token 252 and the natural party dynamic token. Determining a complement may be performed in any mathematically unique way. For example, if the party dynamic token and natural party dynamic token are both 6-digit numbers, the complement could be defined as the difference between them. A similar complement could be defined for alphabetic or alphanumeric tokens. Also, while such difference calculations are conveniently simple, alternative embodiments could use more complicated complement definitions.

The combination of the party dynamic token complement 408 and the random seed value 412 are encrypted at block 336 using a symmetric-key algorithm with third keys designated "C." The combination of the party dynamic token complement 408 and the random seed 412 could be a simple concatenation of those two quantities or could be a more complicated combination in different embodiments.

The party static token 248 is generated at block 340 by encrypting a combination of the encrypted result from block 336, the encrypted host dynamic token 244, the encrypted false host dynamic token 404, and the host static token 240. This combination, which may be formed by a simple concatenation of the quantities or by a more complicated combination, is encrypted using a symmetric-key algorithm with fourth keys designated "D."

At this point, the token preparer 208 has both the party static token 248 and the party dynamic token 252, which may thus be provided to the party 104 at block 344. To provide enhanced security, each of these tokens will usually be provided to the party 104 in a different fashion. For example, the party static token 248 could be downloaded to the party 104 through the public network 108 and public-network access device 204 while the party dynamic token is provided separately by electronic mail, by postal mail, or the like. Typically, the party static token 248 will be stored locally to the party 104 on a computer-readable storage medium, which could be portable as in the case of a CD-ROM or similar data store or could be fixed as in the case of a hard drive of a computer.

As noted in the above description, various encryptions are performed by the token preparer 208 in preparing the party static token 248. In some embodiments, the same encryption algorithm may be used for each encryption; in such instances, it is possible even to use the same keys for each encryption, although improved security is provided when different keys are used in the manner described. In other embodiments, different encryption algorithms could be used for the different encryptions, with, say, a DES algorithm being used for one of the encryptions, an AES algorithm being used for another of the encryptions, and still other symmetric-key encryption algorithms being used for the remainder of the encryptions.

Example The generation of the party tokens in accordance with FIG. 3 may be illustrated with a simplified example. For these purposes of illustration, suppose that at block 304, the host system 112 provides the token preparer 208 with a host static token $S_H$=SMITH and a host dynamic token $D_H$=1234. At block 308, the token preparer generates a false host dynamic token $\overline{D}_H$=9876, which is different from $D_H$ and in this instance happens to be of a similar format to $D_H$. At block 312, the host dynamic token is encrypted with first symmetric keys "A" to produce $$E_A[D_H]=E_A[1234]=827395,$$

and at block 316, the false dynamic token is encrypted with first symmetric keys "A" to produce $$E_A[\overline{D}_H]=E_A[9876]=662883.$$

At block 320, the token preparer 208 generates the party dynamic token randomly to produce $D_P$=2468. At block 324, a random seed value is generated by the token preparer 208 to produce S=629663. Generation of the natural party dynamic token at 328 may be performed by encrypting the seed S with second symmetric keys "B" and extracting the four digits at the 3rd-6th most significant positions:

$$E_B[S]=E_B[629663]=145\underline{8255}73,$$

so that $D_P^{(nat)}$=8255. The party dynamic token complement determined at block 332 may take the form of a difference between $D_P$ and $D_P^{(nat)}$ so that the complement is $$C_P=D_P^{(nat)}-D_P=8255-2468=5787.$$

Encryption of the combination of the seed value S and the party dynamic token complement $C_P$ may produce $$E_C[S \oplus C_P]=E_C[629663 \oplus 5787]$$

$$=E_C[6296635787]$$

$$=9820003628.$$

when the combination is produced by concatenation. Formation of the party static token $S_P$ at block 340 may then proceed by combining the identified quantities and encrypting the combination with fourth keys "D":

$$S_P=E_D[E_A[D_H] \oplus E_A[\overline{D}_H] \oplus E_C[S \oplus C_P] \oplus S_H]$$

$$=E_D[827395 \oplus 662883 \oplus 9820003628 \oplus \text{SMITH}]$$

$$=E_D[8273956628839820003628\text{SMITH}]$$

$$=726B2626FZ28463KR8650025LP03.$$

Figure 4:
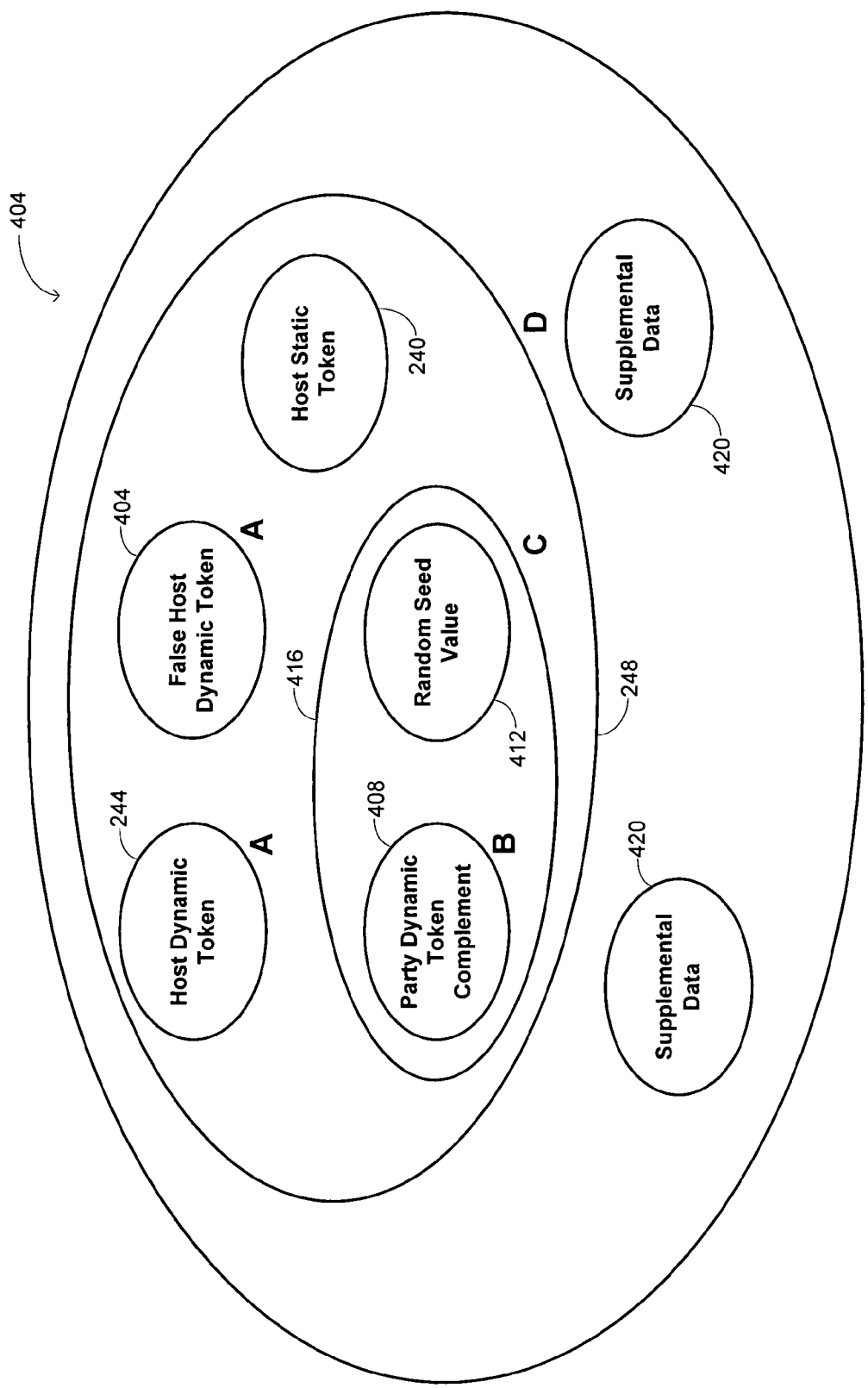
FIG. 4 is a schematic illustrating of a data structure for a party static token in an embodiment of the invention.

The data structure of the party static token 248 after its generation with the method described in connection with FIG. 3 is shown schematically in FIG. 4. Each of the ellipses in the figure represents a data block and correspond to data blocks described in the formation of party static token 248. Those ellipses that are designated with subscripts identify that the data in those data blocks have been generated at least in part through encryption of information. Thus, within the data structure of the party static token 248 are data blocks that correspond to the encrypted host dynamic token 244, the encrypted false host dynamic token 404, the host static token 240, and the encrypted combination 416 of the party dynamic token complement 408 and random seed value 412. In some instances, the transmission of the party static token 248 at block 344 of FIG. 3 may be performed is part of a data block 404 that includes one or more blocks of supplemental data 420 in addition to the party static token 248. Such supplemental data 420 could include routing information and the like that might be used in transmitting the data to the party 104.

The structure of the tokens in embodiments of the invention includes information for which efforts are taken to maintain secrecy of the information, as well as information which is considered to be "clear" and for which no significant secrecy efforts are made. The following table provides a comparison of such secrecy protocols for an exemplary prior-art structure and for the tokens of the invention. In particular, the exemplary prior-art structure corresponds to the PAN/PIN structure discussed previously and commonly used in financial applications. The PAN identifies a financial account and is a prior-art example of a static token, while the customer PIN is a private code used by a customer to access the financial account and is a prior-art example of a dynamic token. In such an example, the "PIN offset" is a complement that is used to map a natural PIN to the customer PIN.

| Prior Art | | Current | |
| --- | --- | --- | --- |
| Information | Secrecy Status | Information | Secrecy Status |
| PAN | Clear | Random Seed Value | Secret |
| Customer PIN | Secret | Party Dynamic Token | Clear |
| Natural PIN | Private | Natural Party Dynamic Token | Private |
| PIN Offset | Clear | Party Dynamic Token Complement | Secret |
| Encryption Keys | Private | Encryption Keys | Private |

The table illustrates that while the prior-art customer PIN, i.e. a prior-art example of a dynamic token, is maintained as secret, embodiments of the invention instead permit the party dynamic token to be treated in the clear. This treatment of the party dynamic token thus represents a significant departure from the way in which security of identification information has traditionally been handled.

Figure 5:
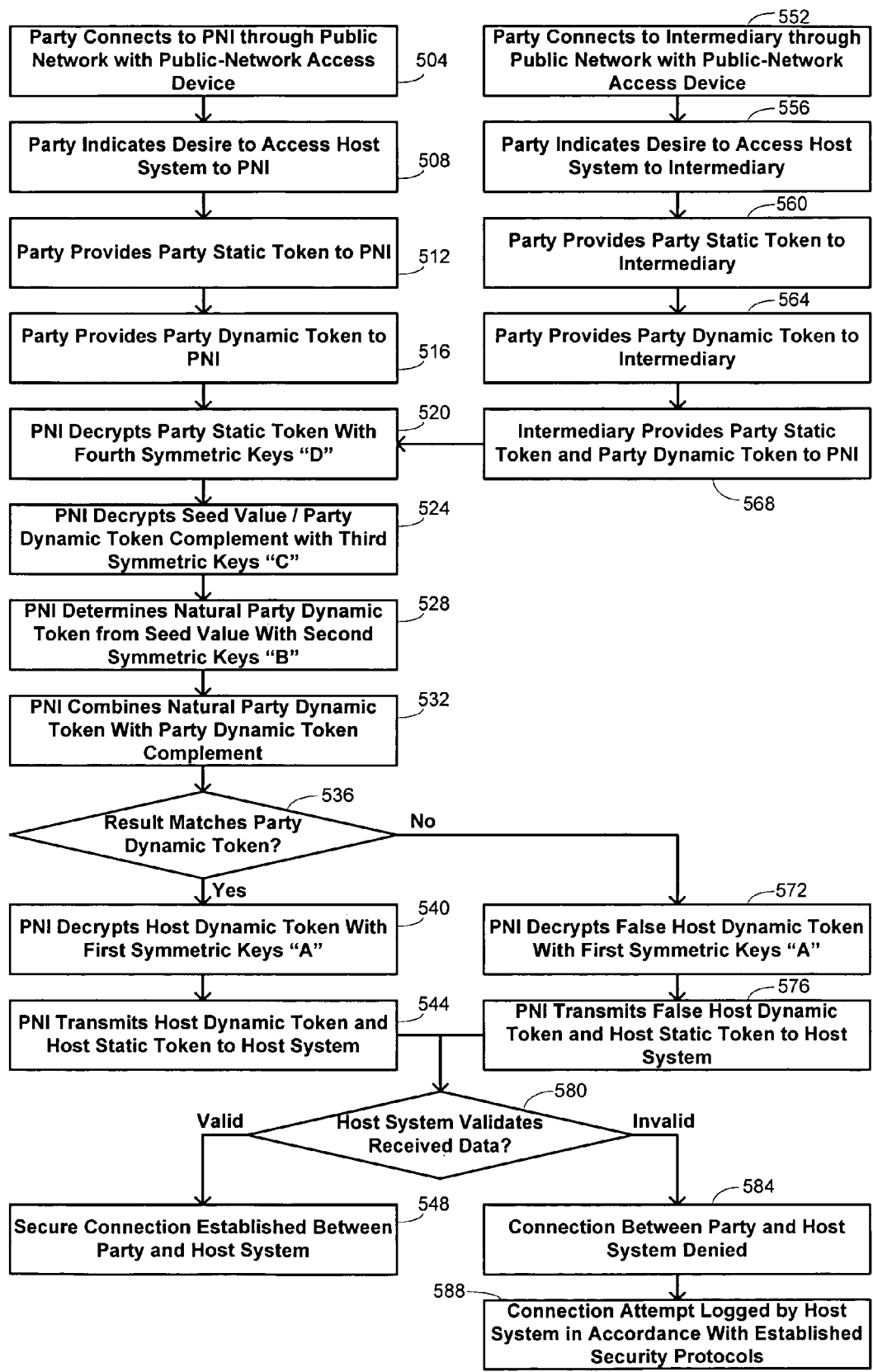
FIG. 5 is a flow diagram illustrating a method for connecting a party with a host system in accordance with an embodiment of the invention.

FIG. 5 provides a flow diagram that illustrates methods by which the party tokens may be used by the party 104 to acquire access to the host system 112. Such access may be acquired in different embodiments by interfacing with the public-network intercept 212 directly through the public network or by transmitting the identification information through an intermediary system 216. Thus, in a case where the access is achieved directly with the public-network intercept 212, the party 104 connects to the public-network intercept 212 with a public-network access device 204 at block 504. Exchange of information between the public-network intercept 212 and the public-network access device 204 is routed over the public network 108. At block 508, the party 104 indicates a desire to access the host system 112 to the public-network intercept 212. This could be done, for example, by identifying a universal resource locator ("URL") in an embodiment where the public network 108 comprises the Internet and the network access device comprises a computer interfaced with the Internet. At blocks 512 and 516 respectively, the party 104 provides the party static token 248 and the party dynamic token 252 to the public-network intercept 212. This could comprise downloading the structurally more complicated static party token 248 from a local data store of the public-network access device 204 to the public-network intercept 212, while entering simpler dynamic party token 252 from the party's memory over a user interface.

In a case where the access is achieved with an intermediary system 216, the party 104 connects to the intermediary system with a public-network access device 204 at block 552. An example of an intermediary system discussed above was made in the context of electronic commerce, although the discussion herein applies generally to any arrangement in which the party's identification information might pass through an intermediary system. At block 556, the party 104 indicates to the intermediary system 216 a desire to access the host system 112. For example, in the context of electronic commerce, such an indication may take the form of providing financial information after the party 104 has decided to make a purchase from the intermediary. At blocks 560 and 564, the party provides the party static token 248 and the party dynamic token 252 to the intermediary system 216. This may be done in a fashion similar to that described with respect to providing such party tokens directly to the public-network intercept, i.e. by downloading the static party token 248 from a local data store and entering the dynamic party token 252 from the party's memory over an interface. At block 568, the intermediary system 216 provides the party tokens 248 and 252 to the public-network intercept 212.

Irrespective of whether the transmission occurs directly, as for blocks 504-516, or indirectly, as for blocks 552-568, the public-network intercept 112 is provided with both the static and dynamic party tokens 248 and 252. The component elements of the party static token 248 are extracted by the public-network intercept 212 at block 520 by decrypting the static party token 248 with the fourth symmetric keys "D." The component element that includes the party dynamic token complement 408 and seed value 412 is decrypted at block 524 using the third symmetric keys "C" to extract those components. At block 528, the decrypted seed value 412 is used to generate a natural party dynamic token in the same fashion that was described in connection with block 328 of FIG. 3. Specifically, an encryption algorithm that uses second keys "B" may be applied to the seed value, and a specific portion of the result extracted to define the natural party dynamic token. The resulting natural party dynamic token is combined with the decrypted party dynamic token complement 408 at block 532, with a check being performed at block 536 whether the result of that combination matches the party dynamic token 252 that was received.

A match of the result with the party dynamic token 252 confirms the identity of the party 104. In response, the public-network intercept 212 decrypts the host dynamic token 244 with the first symmetric keys "A" at block 540. The decrypted host dynamic token 244 is then transmitted with the host static token 240, which was recovered at block 520, to the host system 112. If the result from block 532 instead fails to match the party dynamic token 252 when checked at block 536, the public-network intercept 212 decrypts the false host dynamic token 404 with the first symmetric keys "A" at block 572. This decrypted false host dynamic token 404 is then transmitted to the host system 112 with the host static token 240 at block 576.

The host system 112 remains free to conduct its own validation of the identification information that it receives, thereby permitting full use of its security protocol 116, including the ability to respond to repeated unsuccessful attempts at access. Thus, the host system 112 attempts to validate the data that it receives at block 580, such as by comparing the host dynamic token with a value that it expects to be associated with the host static token that it receives. If the data are validated, as is expected in the case where the check performed at block 536 confirmed the identity of the party 104, a secure connection may be established between the party 104 and the host system 112 at block 548. If the data are not validated, such a connection may be denied at block 584, and the connection attempt may be logged by the host system 112 in accordance with its security protocol 116.

Example The extraction of identification information and its use in establishing or denying a connection between the party 104 and the host system 112 as outlined in FIG. 5 is illustrated with the simplified example discussed previously in connection with FIG. 3. Irrespective of whether the information is transmitted directly from the public-network access device 204 or through an intermediary system 216, the public-network intercept receives the party static token $S_P$=726B2626FZ28463KR8650025LP03 and the party dynamic token $D_P$=2468 at block 520. Decryption of the part static token $S_P$ at block 520 with the fourth symmetric keys "D" results in extraction of the encrypted host dynamic token $E_A[D_H]$, the encrypted false host dynamic token $E_A[\overline{D}_H]$, the encrypted combination of seed value and party dynamic token complement $E_C[S \oplus C_P]$, and the host static token $S_H$:

$$D_D[S_P] = D_D[726B2626FZ28463KR8650025LP03]$$
$$= 827395 \oplus 662883 \oplus 9820003628 \oplus SMITH.$$

At block 524, the combination of the seed value S and party dynamic token complement $C_P$ is identified with the appropriate element and decrypted with the third symmetric keys "C" to identify the individual elements:

$$D_C[E_C[S \oplus C_P]] = D_C[9820003628]$$
$$= 629663 \oplus 5787.$$

The seed value S is used at block 528 to generate the natural party dynamic token $D_P^{(nat)}$ using the algorithm that includes encryption with the second symmetric keys "B" and extraction of specific resulting digits:

$$E_B[S]=E_B[629663]=145\underline{8255}73,$$

so that, as before, $D_P^{(nat)}=8255$. Combining the natural party dynamic token $D_P^{(nat)}$ and the party dynamic token complement $C_P$ at block 532 provides a result R that may be compared with the party dynamic token $D_P$ at block 536:

$$R = D_P^{(nat)} - C_P$$
$$= 8255 - 5787$$
$$= 2468.$$

In this instance, the result matches the party dynamic token, $R=D_P$, so that the host dynamic token is decrypted at block 540:

$$D_H=D_A[E_A[D_H]]=D_A[827395]=1234.$$

The host static token $S_H$=SMITH and host dynamic token $D_H$=1234 are provided to the host system at block 544 so that the host system validates the received data. If the result R had not matched the party dynamic token, $R \neq D_P$, because the incorrect party dynamic token was supplied, the false host dynamic token would be decrypted at block 572, $$\overline{D}_H=D_A[E_A[\overline{D}_H]]=D_A[662883]=9876,$$

and provided to the host system with the host static token $S_H$=SMITH at block 576. The host system would thus deny establishing a connection and would log the attempt in accordance with its security protocols.

The description of the methods in connection with FIGS. 3 and 5 correspond to the case where a single valid host dynamic token 244 is associated with each host static token 240. In other embodiments, the method may accommodate multiple host dynamic tokens 244 for each host static token 240 in those instances where multiple parties may share a host static token 244 but be identified individually by a respective one of a plurality of host dynamic tokens 244. In such instances, token preparer 208 could receive the plurality of host dynamic tokens 244 at block 304 of FIG. 3, with the false host dynamic token 404 generated at block 308 being different from each of the plurality of valid host dynamic tokens 244. Each of those host dynamic tokens 244 may then be encrypted using the first symmetric keys "A" at blocks 312, with other blocks in FIG. 3 being performed as previously described with each host dynamic token 244 to determine a respective plurality of party dynamic token complements 408. This plurality of dynamic token complements may then be combined and encoded with the seed value 412 as described in connection with block 336. The resulting structure of the party static token 248 as shown in FIG. 4 would then be modified so that it includes a plurality of encrypted host dynamic tokens 244 instead of the single one shown, and with data block 416 including a corresponding plurality of party dynamic token complements 408 instead of the single one shown. Use of the tokens in FIG. 5 would then be modified so that a plurality of results are determined at block 532, corresponding to each of the plurality of party dynamic token complements 408. The check at block 536 would be performed to determine whether any of the results match the party dynamic token 252, with the corresponding host dynamic token 244 being decrypted and transmitted to the host system at blocks 540 and 544 if one does. The host system 112 may then respond as it expects, including with provisions that may be included with its security protocol 116, by determining whether a received host static token is accompanied by any of the host dynamic tokens it has identified as valid.

Figure 6:
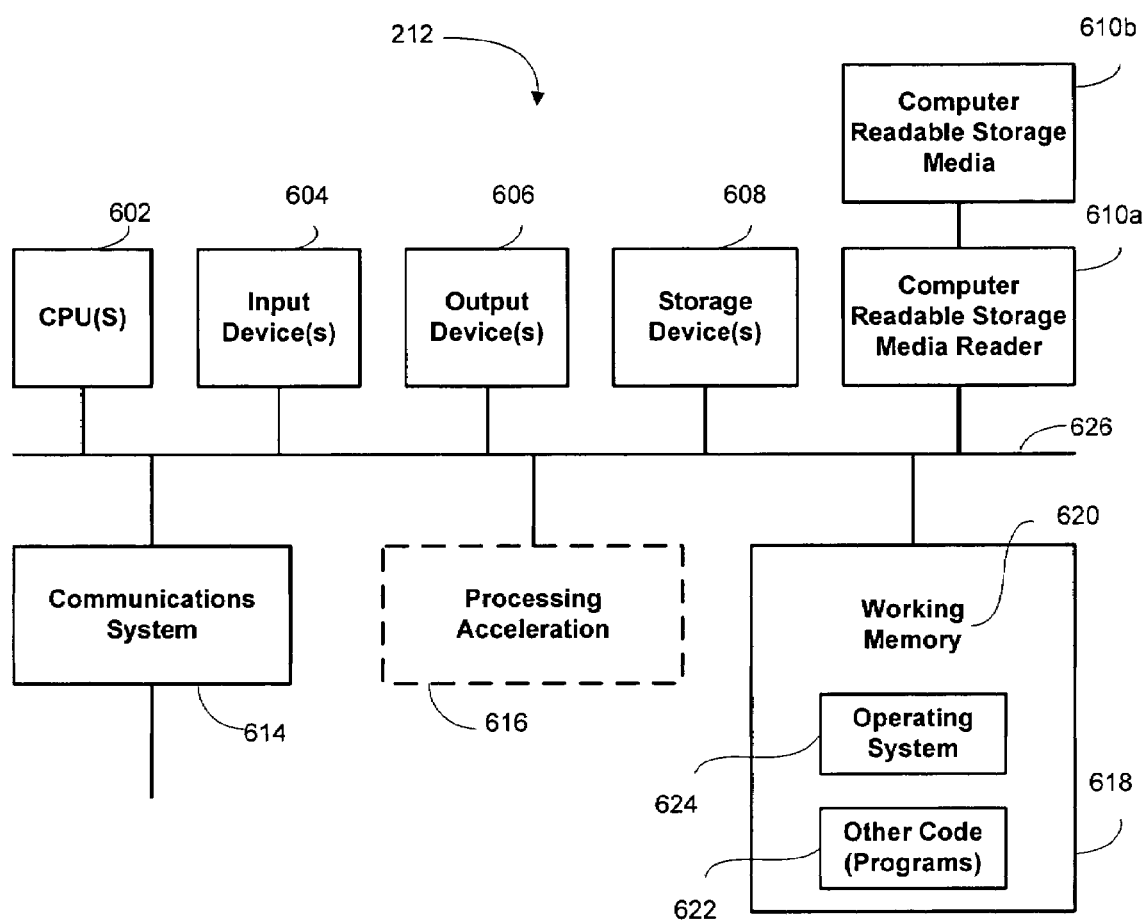
FIG. 6 is a schematic illustration of a computer system on which methods of the invention may be embodied.

FIG. 6 provides a schematic illustration of a structure that may be used to implement the public-network intercept 212. The host system 112 and/or public-network access device 204 could have analogous structures in some embodiments. FIG. 3 broadly illustrates how individual system elements may be implemented in a separated or more integrated manner. The public-network intercept 212 is shown comprised of hardware elements that are electrically coupled via bus 626, including a processor 602, an input device 604, an output device 606, a storage device 608, a computer-readable storage media reader 610*a*, a communications system 614, a processing acceleration unit 616 such as a DSP or special-purpose processor, and a memory 618. The computer-readable storage media reader 610*a* is further connected to a computer-readable storage medium 610*b*, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged with the public network 108 and/or host system 112, as described above.

The public-network intercept 212 also comprises software elements, shown as being currently located within working memory 620, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for generating a party static token to be used in combination with a party dynamic token for identifying a party to a host system, the method comprising:
    receiving identification information that identifies the party to the host system, the information comprising a host dynamic token and a host static token;
    generating a false host dynamic token, wherein the false host dynamic token differs from the host dynamic token;
    encrypting the host dynamic token;
    encrypting the false host dynamic token;
    encrypting information that uniquely identifies the party dynamic token; and
    producing the party static token from a combination of the encrypted host dynamic token, the encrypted false host dynamic token, and the encrypted information that uniquely identifies the party dynamic token.

2. The method recited in claim 1 wherein producing the party static token comprises encrypting the combination of the encrypted host dynamic token, the encrypted false host dynamic token, and the encrypted information that uniquely identifies the party dynamic token.

3. The method recited in claim 2 wherein each of the encrypting steps is performed with a symmetric-key encryption algorithm.

4. The method recited in claim 3 wherein each of the encrypting steps is performed with a different key.

5. The method recited in claim 3 wherein encrypting the host dynamic token and encrypting the false host dynamic token are performed with the same key.

6. The method recited in claim 1 wherein the information that uniquely identifies the party dynamic token comprises a seed value and a complement to the party dynamic token, the method further comprising determining the complement to the party dynamic token from the seed value and the party dynamic token.

7. The method recited in claim 6 wherein determining the complement comprises:
    encrypting the seed value;
    selecting a portion of the encrypted seed value having a predetermined length to produce a natural party dynamic token; and
    calculating a difference between the natural party dynamic token and the party dynamic token.

8. The method recited in claim 6 further comprising generating the seed value randomly.

9. The method recited in claim 1 further comprising receiving the party dynamic token from the host system.

10. The method recited in claim 1 further comprising generating the party dynamic token randomly.

11. A method for transmitting party-identification information to a host system, the method comprising:
    receiving a party static token and a purported party dynamic token from a party;
    decrypting the party static token to extract an encrypted host dynamic token, an encrypted false host dynamic token, a host static token, and encrypted information that uniquely identifies a party dynamic token, wherein the host static token and host dynamic token identify the party to the host system and the false host dynamic token differs from the host dynamic token;
    generating the party dynamic token from the encrypted information that uniquely identifies the party dynamic token; and
    transmitting the host static token and a decrypted one of the host dynamic token and false host dynamic token to the host system depending on a comparison of the party dynamic token and purported party dynamic token.

12. The method recited in claim 11 further comprising decrypting the one of the host dynamic token and false host dynamic token depending on the comparison of the party dynamic token and purported party dynamic token.

13. The method recited in claim 11 wherein receiving the party static token and purported party dynamic token comprises receiving the party static token and purported party dynamic token over a public network from a public-network access device accessed by the party.

14. The method recited in claim 11 wherein receiving the party static token and purported party dynamic token comprises receiving the party static token and purported party dynamic token over a public network from an intermediary system accessed by the party with a public-network access device.

15. The method recited in claim 11 wherein generating the party dynamic token comprises:

decrypting the encrypted information that uniquely identifies the party dynamic token to extract a seed value and a complement to the party dynamic token; and
    generating the party dynamic token from the seed value and the complement.

16. The method recited in claim 15 wherein generating the party dynamic token from the seed value and the complement comprises:
    encrypting the seed value;
    selecting a portion of the encrypted seed value having a predetermined length to produce a natural party dynamic token; and
    calculating a difference between the natural party dynamic token and the complement.

17. The method recited in claim 15 wherein each of the decrypting steps is performed with a symmetric-key decryption algorithm.

18. The method recited in claim 17 wherein each of the decrypting steps is performed with a different key.

19. A computer-readable storage medium having a computer-readable program embodied therein for directing operation of a token preparer including a communications system, a processor, and a storage device, wherein the computer-readable program includes instructions for operating the token preparer to generate a party static token to be used in combination with a party dynamic token for identifying a party to a host system in accordance with the following:
    receiving, with the communications system, identification information that identifies the party to the host system, the information comprising a host dynamic token and a host static token;
    generating, with the processor, a false host dynamic token, wherein the false host dynamic token differs from the host dynamic token;
    encrypting, with the processor, the host dynamic token;
    encrypting, with the processor, the false host dynamic token;
    encrypting, with the processor, information that uniquely identifies the party dynamic token; and
    producing, with the processor, the party static token from a combination of the encrypted host dynamic token, the encrypted false host dynamic token, and the encrypted information that uniquely identifies the party dynamic token.

20. The computer-readable storage medium recited in claim 19 wherein the instructions for producing the party static token comprise instructions for encrypting the combination of the encrypted host dynamic token, the encrypted false host dynamic token, and the encrypted information that uniquely identifies the party dynamic token.

21. The computer-readable storage medium recited in claim 19 wherein the information that uniquely identifies the party dynamic token comprises a seed value and a complement to the party dynamic token, the computer-readable program further including instructions for determining, with the processor, the complement to the party dynamic token from the seed value and the party dynamic token.

22. The computer-readable storage medium recited in claim 21 wherein the instructions for determining the complement comprise:
    instructions for encrypting, with the processor, the seed value;
    instructions for selecting, with the processor, a portion of the encrypted seed value having a predetermined length to produce a natural party dynamic token; and instructions for calculating, with the processor, a difference between the natural party dynamic token and the party dynamic token.

23. The computer-readable storage medium recited in claim 19 wherein the computer-readable program further includes instructions for receiving, with the communications system, the party dynamic token from the host system.

24. The computer-readable storage medium recited in claim 19 wherein the computer-readable program further includes instructions for generating, with the processor, the party dynamic token randomly.

25. A computer-readable storage medium having a computer-readable program embodied therein for directing operation of a public-network intercept including a communications system, a processor, and a storage device, wherein the computer-readable program includes instructions for operating the public-network intercept to transmit party-identification information to a host system in accordance with the following:
   receiving, with the communications system, a party static token and a purported party dynamic token from a party;
   decrypting, with the processor, the party static token to extract an encrypted host dynamic token, an encrypted false host dynamic token, a host static token, and encrypted information that uniquely identifies a party dynamic token, wherein the host static token and host dynamic token identify the party to the host system and the false host dynamic token differs from the host dynamic token;
   generating, with the processor, the party dynamic token from the encrypted information that uniquely identifies the party dynamic token; and
   transmitting, with the communications system, the host static token and a decrypted one of the host dynamic token and false host dynamic token to the host system depending on a comparison of the party dynamic token and purported party dynamic token.

26. The computer-readable storage medium recited in claim 25 wherein the computer-readable program further includes instructions for decrypting, with the processor, the one of the host dynamic token and false host dynamic token depending on the comparison of the party dynamic token and purported party dynamic token.

27. The computer-readable storage medium recited in claim 25 wherein the instructions for generating the party dynamic token comprise:
   instructions for decrypting, with the processor, the encrypted information that uniquely identifies the party dynamic token to extract a seed value and a complement to the party dynamic token; and
   instructions for generating, with the processor, the party dynamic token from the seed value and the complement.

28. The computer-readable storage medium recited in claim 27 wherein the instructions for generating the party dynamic token from the seed value and the complement comprise:
   instructions for encrypting, with the processor, the seed value;
   instructions for selecting, with the processor, a portion of the encrypted seed value having a predetermined length to produce a natural party dynamic token; and
   instructions for calculating, with the processor, a difference between the natural party dynamic token and the complement.

29. A computer-readable storage medium having stored thereon a data structure comprising:
   a first field containing data representing an encrypted host dynamic token;
   a second field containing data representing an encrypted false host dynamic token, wherein the false host dynamic token differs from the host dynamic token;
   a third field containing data representing a host static token, wherein a pairing of the host static token and host dynamic token provide information identifying a party to a host system and a pairing of the host static token and false host dynamic token do not provide information identifying the party to the host system; and
   a fourth field containing data that uniquely identify a party dynamic token that identifies the party when paired with the data structure.

30. The computer-readable storage medium recited in claim 29 wherein the first, second, third, and fourth fields are commonly encrypted with a first symmetric-key encryption algorithm.

31. The computer-readable storage medium recited in claim 30 wherein the host dynamic token and false host dynamic token are encrypted with a common second symmetric-key algorithm.

32. The computer-readable storage medium recited in claim 29 wherein the third field comprises:
   a first subfield containing data representing a seed value; and
   a second subfield containing data representing a party dynamic token complement,
   wherein the host dynamic token is equal to a result of applying a predetermined algorithm to the seed value, the party dynamic token complement, and the party dynamic token.

33. The method recited in claim 29 wherein the data contained by the third field are encrypted with a first symmetric-key algorithm that differs from a second symmetric-key algorithm under which the host dynamic token and false host dynamic token are commonly encrypted.

* * * * *